(12) United States Patent
Dooley et al.

(10) Patent No.: US 6,359,083 B1
(45) Date of Patent: Mar. 19, 2002

(54) OLEFIN POLYMERIZATION PROCESS

(75) Inventors: Kenneth Alan Dooley; Randal Ray Ford; Glenn Edward Moore; Brad Thedford Duckworth; Don Kent Farrer, all of Longview, TX (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 09/563,466

(22) Filed: May 2, 2000

(51) Int. Cl.$^7$ .................................................. C08F 2/34
(52) U.S. Cl. ............................ 526/64; 526/68; 526/901
(58) Field of Search ............................. 526/64, 68, 901

(56) References Cited

U.S. PATENT DOCUMENTS

| | | |
|---|---|---|
| 3,248,179 A | 4/1966 | Norwood |
| 3,709,853 A | 1/1973 | Karapinka |
| 3,944,534 A | 3/1976 | Sennari et al. |
| 4,000,357 A * | 12/1976 | Marano, Jr. .................. 526/228 |
| 4,302,566 A | 11/1981 | Karol et al. |
| 4,390,669 A | 6/1983 | Morita et al. |
| 4,442,271 A | 4/1984 | Rau et al. |
| 4,532,311 A | 7/1985 | Fulks et al. |
| 4,543,399 A | 9/1985 | Jenkins, III et al. |
| 4,710,538 A * | 12/1987 | Jorgensen .................... 525/53 |
| 4,803,251 A | 2/1989 | Goode et al. |
| 4,855,370 A | 8/1989 | Chirillo et al. |
| 4,876,320 A | 10/1989 | Fulks et al. |
| 4,882,400 A | 11/1989 | Dumain et al. |
| 4,902,483 A | 2/1990 | Raufast |
| 4,933,149 A | 6/1990 | Rhee et al. |
| 4,956,427 A | 9/1990 | Jenkins, III et al. |
| 4,970,279 A | 11/1990 | Bailly et al. |
| 4,994,534 A | 2/1991 | Rhee et al. |
| 5,034,479 A | 7/1991 | Eisinger et al. |
| 5,126,414 A | 6/1992 | Cooke et al. |
| 5,194,526 A | 3/1993 | Hussein et al. |
| 5,283,278 A | 2/1994 | Daire et al. |
| 5,326,835 A | 7/1994 | Ahvenainen et al. |
| 5,352,749 A | 10/1994 | DeChellis et al. |
| 5,410,002 A | 4/1995 | Govoni et al. |
| 5,416,175 A | 5/1995 | Song et al. |
| 5,428,118 A | 6/1995 | Painter et al. |
| 5,436,304 A | 7/1995 | Griffin et al. |
| 5,442,018 A | 8/1995 | Cann et al. |
| 5,446,116 A | 8/1995 | Ogawa et al. |
| 5,455,314 A | 10/1995 | Burns et al. |
| 5,461,123 A | 10/1995 | Song et al. |
| 5,541,270 A | 7/1996 | Chinh et al. |
| 5,625,012 A | 4/1997 | Hussein et al. |
| 5,648,581 A | 7/1997 | Kubo et al. |
| 5,677,375 A | 10/1997 | Rifi et al. |
| 5,684,097 A | 11/1997 | Palmroos et al. |
| 5,696,203 A | 12/1997 | Hummel et al. |
| 5,698,642 A | 12/1997 | Govoni et al. |
| 5,728,353 A | 3/1998 | Govoni et al. |
| 5,731,392 A | 3/1998 | Ali et al. |
| 5,866,661 A | 2/1999 | Benham et al. |

FOREIGN PATENT DOCUMENTS

| | | |
|---|---|---|
| BE | 839380 | 9/1976 |
| EP | 0 453 116 A1 | 10/1991 |
| EP | 0 808 848 A2 | 11/1997 |
| GB | 1366376 | 9/1974 |
| WO | WO 97/14721 a1 | 4/1997 |

OTHER PUBLICATIONS

Derwent WPI Acc. No. 95–136850/199518 (JP 7062009 A).

* cited by examiner

*Primary Examiner*—David W. Wu
*Assistant Examiner*—William K Cheung
(74) *Attorney, Agent, or Firm*—Bernard J. Graves, Jr.; Jonathan D. Wood

(57) ABSTRACT

Disclosed is a process for producing polyolefins wherein the solids are conveyed by a gas throughout the polymerization process, thereby resulting in improved operability.

10 Claims, No Drawings

OLEFIN POLYMERIZATION PROCESS

FIELD OF THE INVENTION

The present invention relates to a polymerization process for the production of polyolefins wherein at least 80% of the polyolefin is produced where the gas velocity is at least 3 times the minimum fluidization velocity and the solids are conveyed by a gas throughout the polymerization process. The process results in improved operability, flexibility and throughput.

BACKGROUND OF THE INVENTION

It is well known that olefins, such as ethylene or propylene, can be polymerized in gas-phase, fluid bed processes. Examples of such processes are given in U.S. Pat. Nos. 3,709,853; 4,302,566; 4,543,399; 4,882,400; 5,436,304; and 5,541,270 and Canadian Patent No. 991,798 and Belgian Patent No 839,380.

Gas-phase polymerization of olefins in stirred tank reactors is also practiced. Examples of such processes are given in U.S. Pat. Nos. 3,944,534 and 4,442,271.

U.S. Pat. Nos. 5,696,203 and 5,698,642 discuss a gas-phase polymerization process that utilizes two separate reaction zones to produce polyolefins and sticky polymers. Polymerization occurs under fast-fluidization conditions in the first reaction zone. Polymer particles from the first reaction zone are fed into the second reaction zone, where the particles flow in a densified form under the action of gravity.

Furthermore, it is also known that olefins, such as ethylene or propylene, can be polymerized in liquid slurry processes. An example of such a process is given in U.S. Pat. No. 3,248,179.

With respect to the previously known gas-phase processes for producing polyolefins several disadvantages have been noted. For example, it has been found that sheeting or agglomerates may be formed in the gas-phase processes and also that the throughput per unit volume may be low. With respect to the liquid slurry processes for producing polyolefins, it has been found that reactor fouling or pluggages can occur.

It would be advantageous to have a process for producing polyolefins that may reduce or possibly alleviate the difficulties associated with the previously known processes for producing polyolefins. More specifically, it would be advantageous to have a process for producing polyolefins that may achieve any or all of the following objectives:
1. Reduce or eliminate agglomerate and/or sheeting formation throughout the process,
2. Increase throughput per unit volume,
3. Produces polymers ranging from crystalline to amorphous, and/or
4. Carried out in horizontal, vertical or any other process layout.

The proposed new process is a gas-phase process that addresses many of the limitations of the known polymerization processes. Several advantages of the proposed new process are as follows:
1. Allows use of high-activity catalysts and/or polymerization conditions that increase catalyst activity,
2. Reduces or eliminates sheeting in the polymerization process,
3. May be carried out in horizontal, vertical, or any other orientation,
4. Has capability for producing polymers ranging from crystalline to amorphous,
5. Can increase throughput per unit volume,
6. Reduces the time required to transition the process from producing one product to another, and/or
7. Does not require the use of a start-up bed.

Other aspects, objectives, and advantages of the present invention will be apparent to those skilled in the art.

SUMMARY OF THE INVENTION

The Applicants have discovered a process for polymerizing at least one olefin comprising reacting the at least one olefin under polymerization conditions thereby forming a reaction mixture stream comprising at least one gas component and at least one solid component comprising the polyolefin produced, wherein at least 80% of the polyolefin is produced where the at least one gas component is maintained at a velocity of either at least 3 times the minimum fluidization velocity or at least the saltation velocity, and wherein the at least one solid component is conveyed by the at least one gas component throughout the polymerization process, and recovering the resultant polyolefin.

DETAILED DESCRIPTION OF THE INVENTION

The process of the present invention for polymerizing at least one olefin comprises reacting the at least one olefin under polymerization conditions thereby forming a reaction mixture stream comprising at least one gas component and at least one solid component comprising the polyolefin produced, wherein at least 80% of the polyolefin is produced where the at least one gas component is maintained at a velocity of either at least 3 times the minimum fluidization velocity or at least the saltation velocity, and wherein the at least one solid component is conveyed by the at least one gas component throughout the polymerization process, and recovering the resultant polyolefin.

The process of the present invention is suitable for the production of homopolymers of olefins, particularly ethylene, and/or interpolymers of olefins, particularly ethylene, and at least one or more other olefin(s). Preferably the olefins are alpha-olefins. The olefins, for example, may contain from 2 to 16 carbon atoms. Particularly preferred for preparation herein by the process of the present invention are polyethylenes. Such polyethylenes are preferably homopolymers of ethylene and interpolymers of ethylene and at least one alpha-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, 4-vinylcyclohex-1-ene, 1,5-cyclooctadiene, 5-vinylidene-2-norbornene and 5-vinyl-2-norbornene.

In the present process any polymerization conditions may be employed for producing polyolefins. Any polymerization temperature wherein an olefin can be polymerized may be used. Preferably, the polymerization temperature may generally range from −50° C. to 250° C. In general, the reactor temperature is operated at the highest temperature that is feasible taking into account the sintering temperature of the polyolefin product within the reactor. The sintering temperature of the polyolefin is defined as the temperature at which the polyolefin particles begin to melt and stick together. The total pressure in the present polymerization process may be any pressure wherein an olefin can be polymerized.

Preferably, the total pressure of the polymerization process may generally range from about 25 psig to 1000 psig, preferably from about 50 to about 600 psig. In the case of producing polyethylene, the preferred total pressure generally ranges from about 100 psig to 350 psig.

Also within the present process, the polymerization medium includes polymerization catalyst(s) and/or polymerization initiator(s). Any catalyst and/or initiator known to be useful for polymerizing olefins can be used. The catalyst can be introduced into the polymerization process in any manner and at any location. The catalyst can be introduced in any form, such as in the form of a neat liquid, a solution, a slurry, or a dry free-flowing powder. The catalyst can also be used in the form of a deactivated catalyst or in the form of a prepolymer obtained by contacting the catalyst with one or more olefins.

There may be introduced into the present polymerization process any conventional polymerization additives such as co-catalysts, catalyst modifiers, activity promoters, electron donors, anti-static agents, chain terminating agents, chain transfer agents, catalyst deactivating agents, catalyst kill agents, or mixtures thereof. These materials can be introduced into the polymerization process in any manner and at any location. These materials can be introduced in any form, such as in the form of a neat liquid, a gas or vapor, a solution, a slurry, or a dry free-flowing powder.

The heat of polymerization may be removed using any conventional means. For example, the heat of polymerization can be removed using external cooling jackets, using internal cooling surfaces, providing cold feed gases, providing injected or condensed liquids, providing means to cool recycled gas components, or any combination of these methods. The cooling provided in this manner can be utilized over portions of the polymerization process or throughout the polymerization process.

At least one liquid can be injected directly into the present polymerization process in any suitable manner and at any location, and/or at least one liquid can be prepared in the process by condensing a portion of the gas component. There is not a limit on the amount of liquid condensed or injected as long as the velocity of the remaining gas component is either at least 3 times the minimum fluidization velocity or at least the saltation velocity.

In the present polymerization process, the at least one gas component may include the olefin, hydrogen, nitrogen, hydrocarbons, and any other component within a polymerization process that could be gaseous at the polymerization conditions, or mixtures thereof. Examples of suitable hydrocarbons include methane, ethane, propane, iso-butane, butane, pentane, hexane, and the like.

In the present polymerization process, the at least one solid component must include solid polyolefin product and may include polyolefin catalyst(s), solid anti-static agents, any other solids, or mixtures thereof.

In the present polymerization process, the velocity of the gas component is either at least 3 times the minimum fluidization velocity or at least the saltation velocity. Preferably, the velocity of the gas component ranges from about 8 to 1000 times the minimum fluidization velocity. More preferably, the velocity of the gas component ranges from about 8 to 500 times the minimum fluidization velocity. The minimum fluidization velocity is defined as the velocity of gas passing upward through the solid particles that is required to create a pressure drop sufficient to support the weight of the solids, thereby fluidizing the solid particles. In the case where the polymerization process is carried out in a vertical orientation, the velocity of the gas component is at least 3 times the minimum fluidization velocity. Where the polymerization process is operated in a horizontal orientation, the velocity of the gas component must be at least the saltation velocity of the solid component. The term saltation velocity is defined as the minimum gas velocity at which all the solids can be conveyed as a suspension. Whether horizontal, vertical, or other orientation is used, any velocity in excess of the minimums stated above are suitable for the present polymerization process. The terms minimum fluidization velocity and saltation velocity are further defined in "Pneumatic Conveying of Solids", G. E. Klinzing et. al., published by Chapman and Hall, 1997.

In the present polymerization process, the solid component is conveyed by the gas component throughout the polymerization process.

In the present process, the polymeric product of the polymerization process is recovered by any suitable means. For example, the product can be recovered from the process stream by periodic withdrawals or by a dense phase transfer system.

The invention will be more readily understood by reference to the following example. There are, of course, many other forms of this invention which will become obvious to one skilled in the art, once the invention has been fully disclosed, and it will accordingly be recognized that this example is given for the purpose of illustration only, and is not to be construed as limiting the scope of this invention in any way.

EXAMPLE

In this example, the apparatus consisted of a 0.62 inch inside diameter, 10 foot long, tubular reactor arranged in the form of a substantially horizontal loop. The reactor loop also included a gas-solids separator and a gas-solids ejector. The gas from the gas-solids separator was connected to a pressure control device to control reactor pressure. The solids from the gas-solids separator were fed to the gas-solids ejector. The incoming gas stream, which consisted of ethylene and nitrogen, provided the motive force for operation of the gas-solids ejector. Thus the solids were conveyed around the loop. The apparatus also included a means for introduction of catalyst and cocatalyst, a means for controlling the reactor temperature, and a means for removing the resultant product from the reactor. The heat of polymerization was removed using cooling water jackets on the outside of the reactor tubes as well as controlling the temperature of the incoming gas stream.

The incoming gas stream was a mixture comprised of about 36% purified ethylene and about 64% purified nitrogen. The gaseous mixture was introduced through the gas-solids ejector at a flow rate of approximately 220 lbs/hr and at a temperature of about 84° C. The total pressure of the reactor loop was controlled at about 250 psig. Under these conditions the gas mixture had a velocity of at least 27 ft/sec throughout the polymerization process. The catalyst, 500 milligrams of a silica supported Ziegler-Natta polymerization catalyst that had been preactivated with triethylaluminum at an Al:Ti molar ratio of about 10, was then introduced into the reactor loop through the gas-solids ejector. The polymerization process was carried out for approximately 1 hr. The resultant polyethylene was recovered from the process. Approximately 85 grams of polyethylene homopolymer was recovered. The minimum fluidization velocity for the polyethylene produced was estimated to be about 0.2 ft/sec and the saltation velocity was estimated to be about 20 ft/sec, indicating that the gas velocity during the polymerization process was greater than the saltation velocity and was at least 135 times minimum fluidization velocity.

After the polymerization process, inspection of the reactor loop revealed that there was no fouling or sheeting.

It should be clearly understood that the forms of the invention herein described are illustrative only and are not intended to limit the scope of the invention. The present invention includes all modifications falling within the scope of the following claims.

We claim:

1. A process for polymerizing at least one olefin comprising reacting the at least one olefin, under polymerization conditions, in a loop polymerization reactor, thereby forming a reaction mixture stream comprising at least one gas component and at least one solid component comprising a polyolefin produced, wherein at least 80% of the polyolefin is produced where the at least one gas component is maintained at a velocity of at least 3 times the minimum fluidization velocity, and wherein the at least one solid component is conveyed by the at least one gas component in the loop polymerization reactor, and recovering the resultant polyolefin.

2. The process according to claim 1 wherein the at least one olefin is polymerized in the presence of a component selected from the group consisting of hydrogen, nitrogen, hydrocarbons and mixtures thereof.

3. The process according to claim 1 wherein the at least one olefin is polymerized in the presence of at least one olefin polymerization catalyst.

4. The process according to claim 1 wherein the at least one olefin is polymerized in the presence of at least one liquid.

5. The process according to claim 1 wherein the velocity of the at least one gas component ranges from 8 to 1000 times the minimum fluidization velocity.

6. The process according to claim 1 wherein the velocity of the at least one gas component ranges from 8 to 500 times the minimum fluidization velocity.

7. The process according to claim 1 wherein the at least one gas component is maintained at a velocity of at least saltation velocity.

8. The process according to claim 1 carried out in a tubular, loop reactor.

9. The process according to claim 7 carried out in a tubular, loop reactor.

10. The process according to claim 1 wherein the velocity of the at least one gas component in the loop polymerization reactor where the gas flow is vertical is at least 3 times the minimum fluidization velocity, and wherein the velocity of the at least one gas component in the loop polymerization reactor where the gas flow is horizontal is at least saltation velocity of the at least one solid component.

* * * * *